US012728419B2

(12) United States Patent
Jung et al.

(10) Patent No.: US 12,728,419 B2
(45) Date of Patent: Sep. 8, 2026

(54) CARTRIDGE FOR VIRUS DETECTION AND SYSTEM FOR VIRUS DETECTION

(71) Applicant: UIF (University Industry Foundation), Yonsei University, Seoul (KR)

(72) Inventors: Hyo Il Jung, Seoul (KR); Dong Uk Kim, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 458 days.

(21) Appl. No.: 18/398,515

(22) Filed: Dec. 28, 2023

(65) Prior Publication Data

US 2024/0307878 A1 Sep. 19, 2024

(30) Foreign Application Priority Data

Mar. 17, 2023 (KR) ........................ 10-2023-0035088

(51) Int. Cl.
*B01L 3/00* (2006.01)

(52) U.S. Cl.
CPC . *B01L 3/502761* (2013.01); *B01L 2200/0647* (2013.01); *B01L 2200/0684* (2013.01); *B01L 2200/10* (2013.01); *B01L 2400/0487* (2013.01)

(58) Field of Classification Search
CPC ........... B01L 3/50273; B01L 3/502761; B01L 2200/0647; B01L 2200/0668; B01L 2200/0684; B01L 2200/10; B01L 2300/0816; B01L 2300/0864; B01L 2400/043; B01L 2400/0487; B01L 2400/049; B01L 2400/0694; C12N 2310/20; C12Q 1/70; C12Q 2521/507; C12Q 2563/143; C12Q 2563/149; C12Q 2563/629; C12Q 2563/631
See application file for complete search history.

(56) References Cited

U.S. PATENT DOCUMENTS 8,329,437 B1 * 12/2012 Ayliffe .............. G01N 15/1023
435/173.9

FOREIGN PATENT DOCUMENTS

| | | | |
|---|---|---|---|
| JP | 6956166 | B2 | 10/2021 |
| KR | 2018-0098089 | A | 9/2018 |

* cited by examiner

*Primary Examiner* — Michael L Hobbs
(74) *Attorney, Agent, or Firm* — NORTON ROSE FULBRIGHT US LLP

(57) ABSTRACT

A cartridge for virus detection and a system for virus detection are disclosed. The cartridge includes a sample chamber capable of accommodating therein a sample solution containing therein magnetic beads capable of fixing a virus thereto, wherein a control hole is formed at the sample chamber; a lysis chamber connected to the sample chamber via a channel and capable of receiving the sample solution therefrom, wherein a lysis reaction is carried out in the lysis chamber; and a detection flow path having one or more first degassing holes formed at a downstream end thereof, wherein the detection flow path is capable of extracting the sample solution free of the magnetic beads from the lysis chamber under a negative pressure generated by an interaction between the control hole and the first degassing hole, and of detecting the virus therefrom.

16 Claims, 3 Drawing Sheets

CARTRIDGE FOR VIRUS DETECTION AND SYSTEM FOR VIRUS DETECTION

CROSS-REFERENCE TO RELATED APPLICATIONS

This application claims the benefit of priority to Korean Patent Application No. 10-2023-0035088, filed Mar. 17, 2023, the entire contents of which are hereby incorporated by reference in their entirety.

BACKGROUND

Field

The present disclosure relates to a cartridge for virus detection and a system for virus detection.

Description of Related Art

With the spread of infectious diseases, the importance of accurate and rapid virus detection is emerging. An automated diagnostic device through virus detection various requires chamber and tubes to contain a diagnostic target solution. This has the disadvantage of requiring maintenance such as washing the device or replacing the chamber. Therefore, a virus detection device in which all works are performed within a cartridge, and the device is free from contamination, and does not require maintenance processes such as chamber replacement or washing is required.

SUMMARY

A purpose of the present disclosure is to provide a cartridge for virus detection in which fluid flow and diagnosis are performed only within the cartridge.

Another purpose of the present disclosure is to provide a system for virus detection in which the cartridge is controlled so as to be free of contamination.

One aspect of the present disclosure provides a cartridge for virus detection, the cartridge comprising: a sample chamber capable of accommodating therein a sample solution containing therein magnetic beads capable of fixing a virus thereto, wherein a control hole is formed at the sample chamber; a lysis chamber connected to the sample chamber via a channel and capable of receiving the sample solution therefrom, wherein a lysis reaction is carried out in the lysis chamber; and a detection flow path having one or more first degassing holes formed at a downstream end thereof, wherein the detection flow path is capable of extracting the sample solution free of the magnetic beads from the lysis chamber under a negative pressure generated by an interaction between the control hole and the first degassing hole, and of detecting the virus therefrom.

In one embodiment of the cartridge for virus detection, the cartridge for virus detection further comprises: a washing chamber connected to the lysis chamber via a channel, and accommodating therein a washing solution capable of washing the sample solution in the lysis chamber, wherein a control hole is defined at the washing chamber; and a waste chamber connected to the lysis chamber via a channel, and accommodating therein a waste solution obtained by washing the sample solution in the lysis chamber, wherein a second degassing hole is defined at a downstream end of the waste chamber.

In one embodiment of the cartridge for virus detection, the cartridge for virus detection further comprises a resuspension chamber connected to the lysis chamber via a channel, and accommodating therein a resuspension solution protecting a RNA released when the lysis reaction occurs in the sample solution in the lysis chamber, wherein a control hole is defined at the resuspension chamber.

In one embodiment of the cartridge for virus detection, each of the control holes is spaced apart from each of the channels, wherein each chamber is formed in a funnel structure narrowing in an extension direction of each channel.

In one embodiment of the cartridge for virus detection, the magnetic bead in the sample solution is coated with a predetermined virus immobilization material.

In one embodiment of the cartridge for virus detection, the detection flow path includes: at least one detection solution chamber for accommodating therein a detection solution capable of performing a reaction with the sample solution, wherein a control hole is formed at the detection solution chamber; and at least one detection reaction chamber connected to the detection solution chamber via a channel, wherein in the detection reaction chamber to which the detection solution has been supplied, the detection solution is mixed and reacts with the sample solution.

In one embodiment of the cartridge for virus detection, the detection flow path includes: a RPA solution chamber accommodating therein an RPA solution capable of performing an RPA (Recombinase Polymerase Amplification) reaction with the sample solution, wherein a control hole is formed at the RPA solution chamber; an RPA reaction chamber connected to the RPA solution chamber via a channel, wherein in the RPA reaction chamber to which the RPA solution has been supplied, the RPA solution is mixed with the sample solution such that the RPA reaction is carried out; a CRISPR solution chamber positioned downstream of the RPA reaction chamber and accommodating therein a CRISPR solution capable of performing a CRISPR (Clustered Regularly Interspaced Short Palindromic Repeats) reaction with the sample solution subjected to the RPA reaction, wherein a control hole is defined at the CRISPR solution chamber; and a CRISPR reaction chamber connected to the CRISPR solution chamber via a channel and receiving therein the CRISPR solution, wherein in the CRISPR reaction chamber to which the CRISPR solution has been supplied, the CRISPR solution is mixed with the sample solution such that the CRISPR reaction is carried out.

In one embodiment of the cartridge for virus detection, the cartridge for virus detection comprises two or more detection flow paths, wherein the detection flow paths detect different viruses or different RNAs, respectively.

Another aspect of the present disclosure provides a system for virus detection, the system comprising: a cartridge; and a tray into which the cartridge is mounted, wherein the cartridge includes: a sample chamber capable of accommodating therein a sample solution containing therein magnetic beads capable of fixing a virus thereto, wherein a control hole is formed at the sample chamber; a lysis chamber connected to the sample chamber via a channel and capable of receiving the sample solution therefrom, wherein a lysis reaction is carried out in the lysis chamber; and a detection flow path having one or more first degassing holes formed at a downstream end thereof, wherein the detection flow path is capable of extracting the sample solution free of the magnetic beads from the lysis chamber under a negative pressure generated by an interaction between the control hole and the first degassing hole, and of detecting the virus therefrom, wherein the tray includes: a magnetic force applicator disposed adjacent to the lysis chamber to apply a magnetic force to the magnetic bead to fix the magnetic bead thereto when the cartridge has been mounted into the tray; a negative pressure pump capable of applying the negative pressure to the first degassing hole; an actuator capable of controlling opening and closing of the control hole; and a controller capable of operating the magnetic force applicator, the negative pressure pump, and the actuator according to a predetermined order and timing.

In one embodiment of the system for virus detection, the cartridge further includes: a washing chamber connected to the lysis chamber via a channel, and accommodating therein a washing solution capable of washing the sample solution in the lysis chamber, wherein a control hole is defined at the washing chamber; and a waste chamber connected to the lysis chamber via a channel, and accommodating therein a waste solution obtained by washing the sample solution in the lysis chamber, wherein a second degassing hole is defined at a downstream end of the waste chamber, wherein the tray further includes an actuator capable of controlling opening and closing of the control hole of the washing chamber, wherein the negative pressure pump is capable of applying the negative pressure to the second degassing hole.

In one embodiment of the system for virus detection, the cartridge further includes a resuspension chamber connected to the lysis chamber via a channel, and accommodating therein a resuspension solution protecting a RNA released when the lysis reaction occurs in the sample solution in the lysis chamber, wherein a control hole is defined at the resuspension chamber, wherein the tray further includes an actuator capable of controlling opening and closing of the control hole of the resuspension chamber.

In one embodiment of the system for virus detection, each of the control holes is spaced apart from each of the channels, wherein each chamber is formed in a funnel structure narrowing in an extension direction of each channel.

In one embodiment of the system for virus detection, the magnetic bead in the sample solution is coated with a predetermined virus immobilization material.

In one embodiment of the system for virus detection, the detection flow path includes: at least one detection solution chamber for accommodating therein a detection solution capable of performing a reaction with the sample solution, wherein a control hole is formed at the detection solution chamber; and at least one detection reaction chamber connected to the detection solution chamber via a channel, wherein in the detection reaction chamber to which the detection solution has been supplied, the detection solution is mixed and reacts with the sample solution, wherein the tray further includes an actuator capable of controlling opening and closing of the control hole of the detection solution chamber.

In one embodiment of the system for virus detection, the detection flow path includes: a RPA solution chamber accommodating therein an RPA solution capable of performing an RPA (Recombinase Polymerase Amplification) reaction with the sample solution, wherein a control hole is formed at the RPA solution chamber; an RPA reaction chamber connected to the RPA solution chamber via a channel, wherein in the RPA reaction chamber to which the RPA solution has been supplied, the RPA solution is mixed with the sample solution such that the RPA reaction is carried out; a CRISPR solution chamber positioned downstream of the RPA reaction chamber and accommodating therein a CRISPR solution capable of performing a CRISPR (Clustered Regularly Interspaced Short Palindromic Repeats) reaction with the sample solution subjected to the RPA reaction, wherein a control hole is defined at the CRISPR solution chamber; and a CRISPR reaction chamber connected to the CRISPR solution chamber via a channel and receiving therein the CRISPR solution, wherein in the CRISPR reaction chamber to which the CRISPR solution has been supplied, the CRISPR solution is mixed with the sample solution such that the CRISPR reaction is carried out, wherein the tray further includes an actuator capable of controlling opening and closing of each of the control hole of the RPA solution chamber and the control hole of the CRISPR solution chamber.

In one embodiment of the system for virus detection, the cartridge includes two or more detection flow paths, wherein the detection flow paths detect different viruses or different RNAs, respectively.

The cartridge for virus detection according to an embodiment of the present disclosure may allow the fluid to flow only within the cartridge in a completely automated manner such that the virus may be detected thereby.

The system for virus detection according to an embodiment of the present disclosure may manipulate the cartridge for virus detection.

DETAILED DESCRIPTIONS

Figure 1:
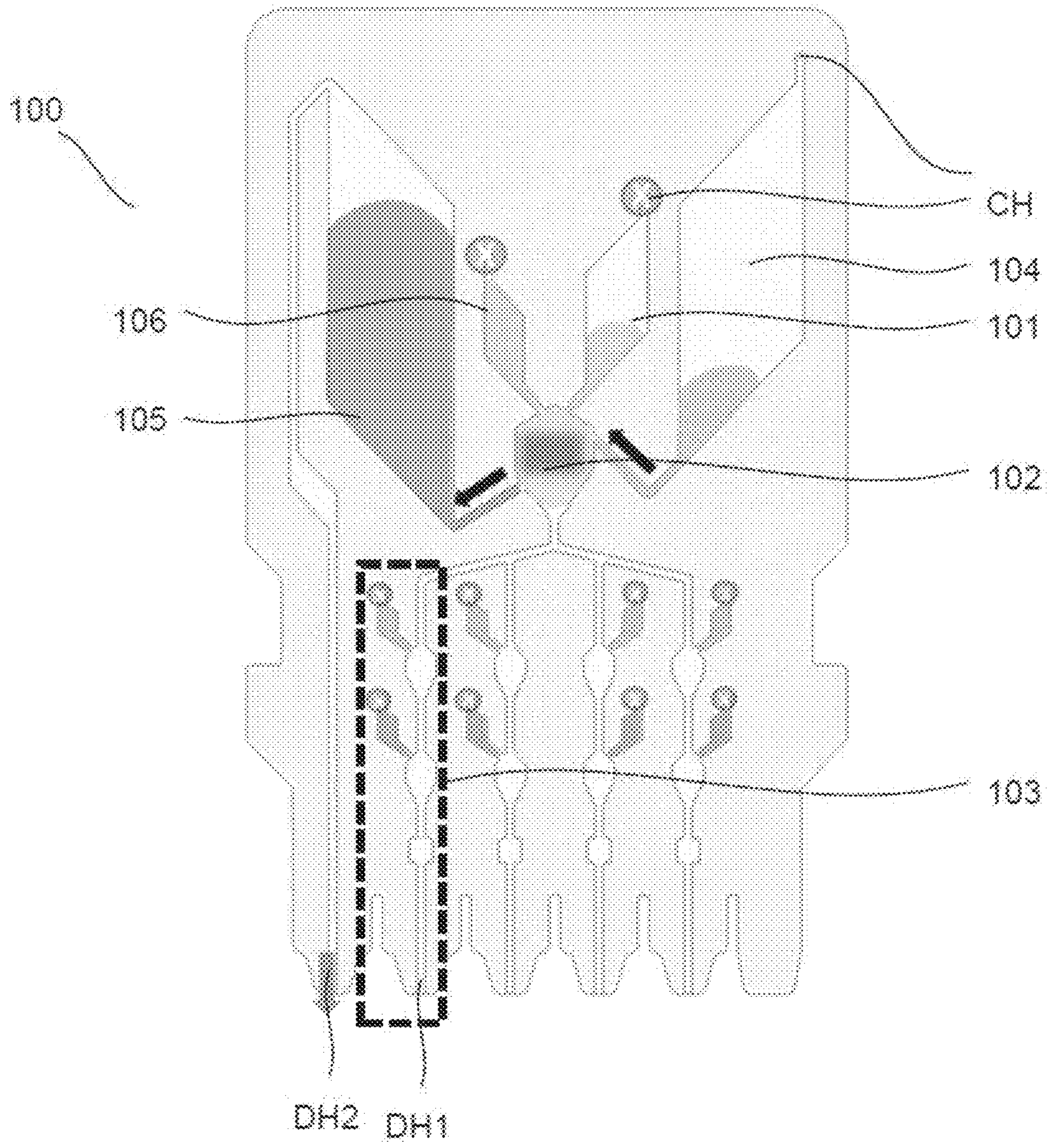
FIG. 1 is a diagram showing a cartridge for virus detection according to an embodiment of the present disclosure.

Hereinafter, embodiments of the present disclosure will be described in detail with reference to the attached drawings. The present disclosure may have various changes and take various forms. Thus, the present disclosure is intended to illustrate specific embodiments in drawings and describe those in detail in the text. However, this is not intended to limit the present disclosure to a specific disclosure form, and it should be understood that the present disclosure includes all changes, equivalents, or substitutes included in the idea and technical scope of the present disclosure. While describing the drawings, similar reference numerals are used for similar components. In the attached drawings, the dimensions of the structures are enlarged from the actual size to ensure clarity of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram showing a cartridge for virus detection according to an embodiment of the present disclosure.

Referring to FIG. 1, a cartridge 100 for virus detection according to an embodiment of the present disclosure may include a sample chamber 101 which may accommodate therein a sample solution containing therein magnetic beads capable of fixing a virus thereto, and in which a control hole CH is formed; a lysis chamber 102 connected to the sample chamber 101 via a channel and capable of receiving the sample solution and allowing a lysis reaction to be performed therein; and a detection flow path 103 having one or more first degassing holes DH1 formed at a downstream end thereof, and capable of extracting the sample solution excluding the magnetic beads from the lysis chamber 102 under a negative pressure generated by an interaction between the control hole 101C and the first degassing hole DH1 and detecting the virus therefrom.

A dimension and an arrangement of each member in FIG. 1 are illustrative and do not limit the scope of the present disclosure. For example, positions of different chambers may be changed as long as a connection relationship therebetween is not changed, and relative sizes thereof may also be different from those as shown in FIG. 1.

The sample chamber 101 is a chamber in which the sample solution subject to detection is accommodated. In the context of the present disclosure, "chamber" may refer collectively to any space formed to have a significant size to accommodate fluid therein.

The sample chamber 101 receives therein the sample solution, and the sample solution may contain the magnetic beads. In one embodiment, the magnetic beads in the sample solution may be coated with a predetermined virus immobilization material. In an example, the predetermined virus immobilization material may be an antibody. Thus, the virus may be fixed onto a surface of the magnetic bead and may be fixed thereto under a magnetic force to prevent the same from being washed away during a washing process to be described below.

The control hole is a member formed in a specific chamber to control entry of air thereto from a stream opposite to a direction in which the negative pressure is applied. The control hole may be opened or closed by operator manipulation or an external device. The present disclosure is at least based on the discovery that control of fluid with improved stability is achieved when the flow of fluid is controlled by controlling opening and closing of the control hole while the negative pressure is applied into the flow path. Therefore, rather than controlling the fluid based on whether the negative pressure is applied to the degassing hole which will be described below, or based on a magnitude of the negative pressure, the control hole may be opened to allow the fluid to flow while a predefined negative pressure is applied thereto, and the control hole may be closed to stop the flow of the fluid, thereby facilitating more precise and stable fluid flow.

The lysis chamber 102 is a chamber in which at least the lysis reaction may occur. Therefore, a further control hole may be formed at one side of the sample chamber 101 adjacent to the downstream end where the degassing hole is formed. The lysis chamber 102 may communicate with the further control hole. Thus, when the further control hole is opened, the sample solution may flow from the sample chamber 101 to the lysis chamber 102. In the context of the present disclosure, the lysis reaction may refer to a reaction capable of releasing at least a base sequence from the virus. For example, the RNA of the virus to be detected may be released therefrom under the lysis reaction.

Although a member capable of applying the magnetic force is not a component of the cartridge 100 for virus detection according to an embodiment of the present disclosure, the member capable of applying the magnetic force may be formed at a position adjacent to the lysis chamber 102. Thus, when the sample solution contains the magnetic beads, the magnetic beads may remain in the lysis chamber 102 under the applied magnetic force even during the washing process to be described below.

The first degassing hole DH1 is a member to which the negative pressure may be applied. In particular, the first degassing hole DH1 is one directed toward the detection flow path 103 among at least two holes in the downstream end that the cartridge 100 for virus detection according to an embodiment of the present disclosure may include. Thus, the negative pressure applied to the first degassing hole DH1 may move the fluid toward the detection flow path 103.

The fluid moved under the negative pressure applied to the first degassing hole DH1 may flow along the detection flow path 103. A detection reaction of the virus may occur in the detection flow path 103 according to a set order. In the context of the present disclosure, "virus detection" may encompass a reaction or process that may check presence of the virus via reaction with the base sequence of the virus, and a reaction or process that amplifies the base sequence for the reaction.

The cartridge 100 for virus detection according to an embodiment of the present disclosure does not exclude addition of other elements. In one embodiment, the cartridge 100 for virus detection may further include a washing chamber 104 connected to the lysis chamber 102 via a channel, and containing therein a washing solution capable of washing the sample solution in the lysis chamber 102. A control hole may be formed at the washing chamber 104. In the context of the present disclosure, "washing" may refer to a process of significantly removing substances other than a substance subject to the detection.

Moreover, in one embodiment, the cartridge 100 for virus detection may further include a waste chamber 105 connected to the lysis chamber 102 via a channel, and accommodating therein a waste solution obtained by washing the sample solution in the lysis chamber 102 and having a second degassing hole DH2 at a downstream end thereof. The waste chamber 105 may be a chamber that accommodates therein the waste solution obtained after the washing solution washes the sample solution in the lysis chamber 102.

The second degassing hole DH2 may be formed at the downstream end of the waste chamber 105. The first degassing hole DH1 and the second degassing hole DH2 may be formed at different positions of the downstream end, so that the sample solution and the waste solution are not re-mixed with each other in the downstream end.

While the washing process is in progress, the magnetic force may be applied to the lysis chamber 102 to fix the magnetic beads to the magnetic force application means.

In one embodiment, the cartridge 100 for virus detection may further include a resuspension chamber 106 connected to the lysis chamber 102 via a channel. A resuspension solution protecting the RNA released from the virus when the lysis reaction occurs in the sample solution in the lysis chamber 102 may be contained in the resuspension chamber 106. A control hole may be formed at the resuspension chamber 106. The resuspension chamber 106 may be connected to the lysis chamber 102, so that the resuspension solution may be injected therefrom into the lysis chamber 102 when the lysis reaction progresses. The resuspension solution may stabilize the RNA released after the lysis reaction so that the RNA does not experience collapse of a molecular structure thereof within the sample solution.

In one example, the structure of each of the chambers is not particularly limited as long as a connecting structure therebetween is formed as described above and each chamber performs its function. In one embodiment, each control hole may be formed so as to be spaced apart from each channel. In one embodiment, each chamber may be formed as a funnel structure that narrows in an extension direction of each channel. Forming each chamber to have the structure as described above may disallow unstable phenomena such as formation of bubbles in the fluid discharged from each chamber.

Figure 2:
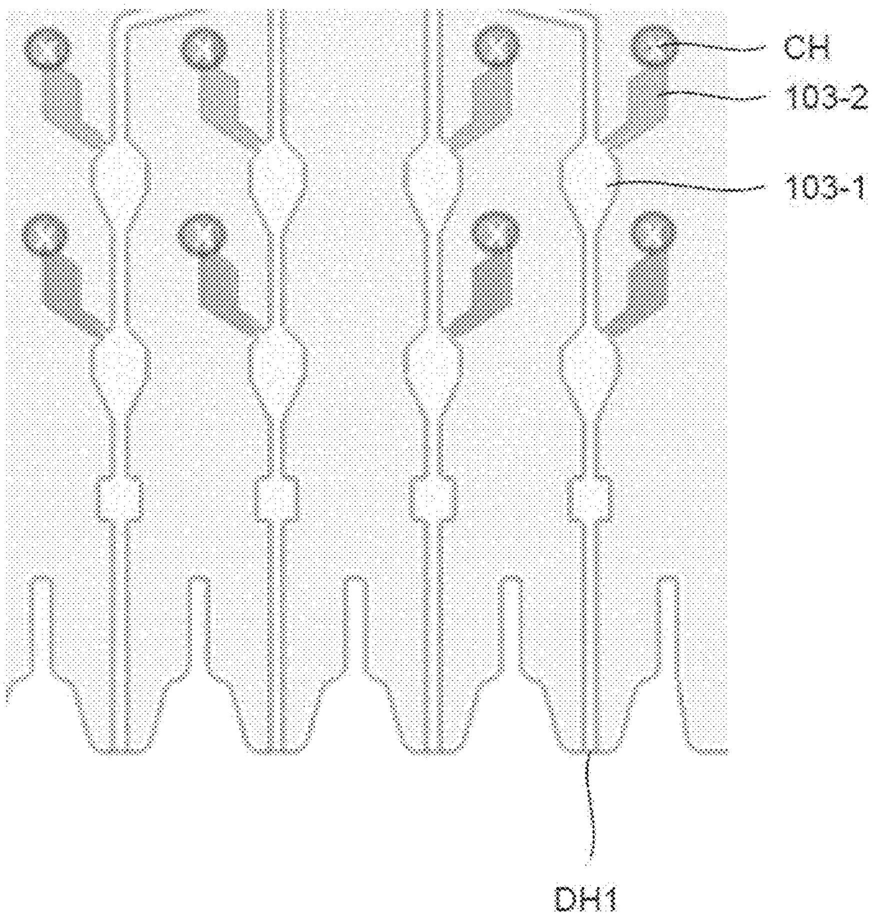
FIG. 2 is an enlarged view of a detection flow path.

FIG. 2 is an enlarged view of the detection flow path 103.

Referring to FIG. 2, the detection flow path 103 may include at least one detection solution chamber 103-1 that may accommodate therein the detection solution capable of performing a reaction with the sample solution and has a control hole formed therein; and at least one detection reaction chamber 103-1 connected to the detection solution chamber 103-1 via a channel, wherein in the detection reaction chamber 103-1 to which the detection solution is supplied, the detection solution is mixed and reacts with the sample solution.

The detection solution chamber 103-1 is a chamber that may accommodate therein the detection solution that may detect viruses when being mixed with the sample solution. The detection solution chamber 103-1 may have the control hole, and the detection solution may be discharged into the detection reaction chamber 103-1 through the interaction between the control hole and the first degassing hole DH1.

The detection reaction chamber 103-1 is a chamber in which the sample solution and the detection solution are mixed with each other such that the detection reaction may be carried out.

The detection flow path 103 may be designed depending on a type and the number of detection reactions. At least one detection solution chamber 103-1 and at least one detection reaction chamber 103-1 may be formed. The detection solution may be accommodated therein in various ways. When each of the number of the detection solution chambers 103-1 and the number of the detection reaction chambers 103-1 is at least two, the detection solution chambers 103-1 may be connected to each other in series or parallel, and the detection reaction chambers 103-1 may be connected to each other in series or parallel.

In one embodiment, the detection flow path 103 may include a RPA solution chamber accommodating therein an RPA solution capable of performing an RPA (Recombinase Polymerase Amplification) reaction with the sample solution and having a control hole formed therein; and an RPA reaction chamber connected to the RPA solution chamber via a channel, wherein in the RPA reaction chamber to which the RPA solution is supplied, the RPA solution is mixed with the sample solution such that the RPA reaction is carried out. The detection flow path 103 may further include a CRISPR solution chamber formed downstream of the RPA reaction chamber and accommodating therein a CRISPR solution capable of performing a CRISPR (Clustered Regularly Interspaced Short Palindromic Repeats) reaction with the sample solution subjected to the RPA reaction, and having a control hole defined therein; and a CRISPR reaction chamber connected to the CRISPR solution chamber via a channel and receiving the CRISPR solution, wherein in the CRISPR reaction chamber, the CRISPR solution is mixed with the sample solution such that the CRISPR reaction is carried out.

The cartridge 100 for virus detection according to an embodiment of the present disclosure is not limited to a configuration that each member is embodied as a single member. In one embodiment, the cartridge 100 for virus detection may include two or more detection flow paths 103. In one embodiment, the detection flow paths 103 may detect different viruses or different RNAs, respectively.

Figure 3:
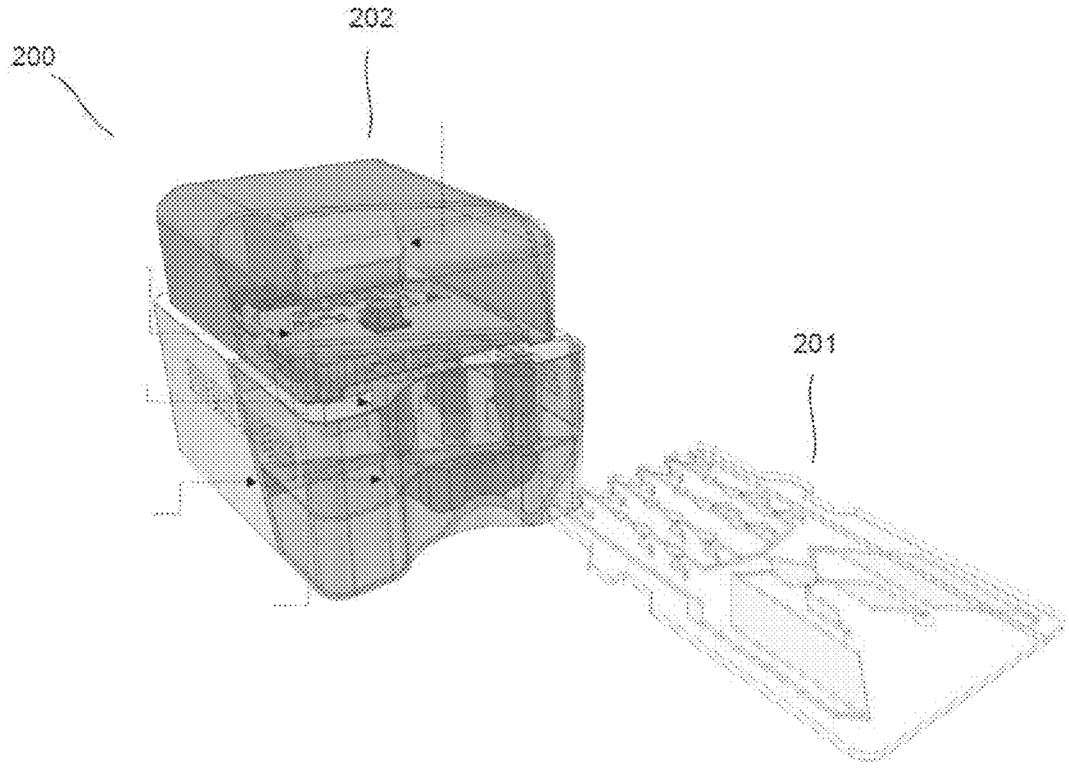
FIG. 3 is a diagram schematically showing a system for virus detection according to an embodiment of the present disclosure.

FIG. 3 is a diagram schematically showing a system for virus detection according to an embodiment of the present disclosure.

Referring to FIG. 3, a system 200 for virus detection according to an embodiment of the present disclosure may include a cartridge 201 and a tray 202. The cartridge 201 may be embodied as the cartridge 100 for virus detection according to an embodiment of the present disclosure as described above.

That is, the system for virus detection according to an embodiment of the present disclosure may include a cartridge including a sample chamber which may accommodate therein a sample solution containing therein magnetic beads capable of fixing a virus thereto, and in which a control hole is formed; a lysis chamber connected to the sample chamber via a channel and capable of receiving the sample solution and allowing a lysis reaction to be performed therein; and a detection flow path having one or more first degassing holes formed at a downstream end thereof, and capable of extracting the sample solution excluding the magnetic beads from the lysis chamber under a negative pressure generated by an interaction between the control hole and the first degassing hole and detecting the virus therefrom; and a tray into which the cartridge may be mounted, wherein the tray includes a magnetic force applicator disposed adjacent to the lysis chamber to apply the magnetic force to fix the magnetic bead thereto when the cartridge has been mounted into the tray; a negative pressure pump capable of applying the negative pressure to the first degassing hole; an actuator capable of controlling the opening and closing of the control hole; and a controller capable of operating the magnetic force applicator, the negative pressure pump, and the actuator according to a predetermined order and timing.

Regarding the description of the system for virus detection according to an embodiment of the present disclosure, the same or similar component or terms as or to the component or the terms in the description of the cartridge for virus detection according to an embodiment of the present disclosure as described above may be identically or similarly subjected to the description of the component or the terms in the description of the cartridge.

The tray is a device on which the cartridge is mounted and is configured to at least control the flow of the fluid within the cartridge, and may be designed to be customized to the cartridge. Therefore, FIG. 2 is an exemplary drawing to illustrate that the cartridge may be mounted on the tray, and detailed locations or shapes of the members shown in FIG. 2 do not particularly limit the scope of the present disclosure.

In one embodiment, the cartridge may further include a washing chamber connected to the lysis chamber via a channel, and containing therein a washing solution capable of washing the sample solution in the lysis chamber, wherein a control hole may be formed at the washing chamber; and a waste chamber connected to the lysis chamber via a channel, and accommodating therein a waste solution obtained by washing the sample solution in the lysis chamber and having a second degassing hole at a downstream end thereof. In one embodiment, the tray may further include an actuator that may control the opening and closing of the control hole of the washing chamber. In one embodiment, the negative pressure pump may apply the negative pressure to the second degassing hole. In one embodiment, the cartridge may further include a resuspension chamber connected to the lysis chamber via a channel, wherein a resuspension solution protecting the RNA released from the virus when the lysis reaction occurs in the sample solution in the lysis chamber may be contained in the resuspension chamber, wherein a control hole may be formed at the resuspension chamber. In one embodiment, the tray may further include an actuator that may control the opening and closing of the control hole of the resuspension chamber. In one embodiment, each control hole of the cartridge may be formed so as to be spaced apart from each channel. In one embodiment, each chamber may be formed as a funnel structure that narrows in an extension direction of each channel. In one embodiment, the magnetic bead in the sample solution may be coated with a predetermined virus immobilization material. In one embodiment, the detection flow path may include at least one detection solution chamber that may accommodate therein the detection solution capable of performing a reaction with the sample solution and has a control hole formed therein; and at least one detection reaction chamber connected to the detection solution chamber via a channel, wherein in the detection reaction chamber to which the detection solution is supplied, the detection solution is mixed and reacts with the sample solution. In one embodiment, the tray may further include an actuator that may control the opening and closing of the control hole of the detection solution chamber. In one embodiment, the detection flow path of the cartridge may include a RPA solution chamber accommodating therein an RPA solution capable of performing an RPA (Recombinase Polymerase Amplification) reaction with the sample solution and having a control hole formed therein; and an RPA reaction chamber connected to the RPA solution chamber via a channel, wherein in the RPA reaction chamber to which the RPA solution is supplied, the RPA solution is mixed with the sample solution such that the RPA reaction is carried out. The detection flow path 103 may further include a CRISPR solution chamber formed downstream of the RPA reaction chamber and accommodating therein a CRISPR solution capable of performing a CRISPR (Clustered Regularly Interspaced Short Palindromic Repeats) reaction with the sample solution subjected to the RPA reaction, and having a control hole defined therein; and a CRISPR reaction chamber connected to the CRISPR solution chamber via a channel and receiving the CRISPR solution, wherein in the CRISPR reaction chamber, the CRISPR solution is mixed with the sample solution such that the CRISPR reaction is carried out. In one embodiment, the tray may further include an actuator capable of controlling the opening and closing of each of the control hole of the RPA solution chamber and the control hole of the CRISPR solution chamber. In one embodiment, the cartridge for virus detection includes two or more detection flow paths. The detection flow paths may detect different viruses or different RNAs, respectively.

Hereinafter, examples of the present disclosure are described in detail. However, the examples as described below are only some embodiments of the present disclosure, and the scope of the present disclosure is not limited to the following examples.

Manufacturing Example

A microfluidic chip having internal chambers and channels defined therein is manufactured. A lysis chamber is defined in a center area thereof, and each of a washing chamber, a sample chamber, a resuspension chamber, and a waste chamber connected to the lysis chamber is formed. A control hole is formed in each of the washing chamber, the sample chamber, and the resuspension chamber, and a channel is formed at one side of the waste chamber and a degassing hole is defined at a downstream end thereof.

Four detection flow paths are branched from a bottom of the lysis chamber, and a degassing hole is formed at a downstream end of each of the detection flow paths. Each detection flow path includes an RPA reaction chamber and a CRISPR reaction chamber arranged in series in that order in a flow direction, and a RPA solution chamber is connected to the RPA reaction chamber and a CRISPR solution chamber is connected to the CRISPR reaction chamber. A control hole is formed at each of the RPA solution chamber and the CRISPR solution chamber.

As a result, a cartridge according to an embodiment of the present disclosure is manufactured.

Examples

The sample is injected into the sample chamber. The sample contains the magnetic beads coated with antibodies which capture the virus. The sample flows to the lysis chamber under the interaction of the control hole and the degassing hole. The magnetic force applicator of the tray into which the cartridge has been mounted applies the magnetic force to the lysis chamber while being positioned adjacent to the lysis chamber. The magnetic bead is fixedly positioned within the lysis chamber under the magnetic force, and the interaction between the control hole and the degassing hole allows the washing solution to flow from the washing chamber through the lysis chamber to the waste chamber. Ingredients except the fixed magnetic beads are washed.

Next, the resuspension solution in the resuspension chamber flows to the lysis chamber under an interaction of the control hole and the degassing hole, and then the lysis chamber is heated. The RNA is released from the virus, and the resuspension solution stably protects the RNA structure.

The sample solution containing the released RNA flows to the first detection flow path under the interaction of the control hole and the degassing hole. When the sample reaches the RPA reaction chamber, the flow stops. The RPA reaction solution flows to the RPA reaction chamber. When the RPA reaction has been performed, the sample flows again to the CRISPR reaction chamber due to the interaction between the control hole and the degassing hole. The CRISPR reaction solution flows to the CRISPR reaction chamber.

The interactions between all of the control holes and the degassing hole are achieved using the negative pressure pump and the actuator of the tray.

Although the present disclosure has been described above with reference to preferred embodiments of the present disclosure, those skilled in the art may modify and change the present disclosure in various ways without departing from the spirit and scope of the present disclosure as set forth in the patent claims below.

What is claimed is:

1. A cartridge for virus detection, the cartridge comprising:

a sample chamber capable of accommodating therein a sample solution containing therein magnetic beads capable of fixing a virus thereto, wherein a control hole is formed at the sample chamber;

a lysis chamber connected to the sample chamber via a channel and capable of receiving the sample solution therefrom, wherein a lysis reaction is carried out in the lysis chamber; and a detection flow path having one or more first degassing holes formed at a downstream end thereof, wherein the detection flow path is capable of extracting the sample solution free of the magnetic beads from the lysis chamber under a negative pressure generated by an interaction between the control hole and the first degassing hole, and of detecting the virus therefrom.

2. The cartridge for virus detection of claim 1, wherein the cartridge for virus detection further comprises:

a washing chamber connected to the lysis chamber via a channel, and accommodating therein a washing solution capable of washing the sample solution in the lysis chamber, wherein a control hole is defined at the washing chamber; and a waste chamber connected to the lysis chamber via a channel, and accommodating therein a waste solution obtained by washing the sample solution in the lysis chamber, wherein a second degassing hole is defined at a downstream end of the waste chamber.

3. The cartridge for virus detection of claim 1, wherein the cartridge for virus detection further comprises a resuspension chamber connected to the lysis chamber via a channel, and accommodating therein a resuspension solution protecting a RNA released when the lysis reaction occurs in the sample solution in the lysis chamber, wherein a control hole is defined at the resuspension chamber.

4. The cartridge for virus detection of claim 1, wherein each of the control holes is spaced apart from each of the channels, wherein each chamber is formed in a funnel structure narrowing in an extension direction of each channel.

5. The cartridge for virus detection of claim 1, wherein the magnetic bead in the sample solution is coated with a predetermined virus immobilization material.

6. The cartridge for virus detection of claim 1, wherein the detection flow path includes:

at least one detection solution chamber for accommodating therein a detection solution capable of performing a reaction with the sample solution, wherein a control hole is formed at the detection solution chamber; and at least one detection reaction chamber connected to the detection solution chamber via a channel, wherein in the detection reaction chamber to which the detection solution has been supplied, the detection solution is mixed and reacts with the sample solution.

7. The cartridge for virus detection of claim 1, wherein the detection flow path includes:

a RPA solution chamber accommodating therein an RPA solution capable of performing an RPA (Recombinase Polymerase Amplification) reaction with the sample solution, wherein a control hole is formed at the RPA solution chamber;

an RPA reaction chamber connected to the RPA solution chamber via a channel, wherein in the RPA reaction chamber to which the RPA solution has been supplied, the RPA solution is mixed with the sample solution such that the RPA reaction is carried out;

a CRISPR solution chamber positioned downstream of the RPA reaction chamber and accommodating therein a CRISPR solution capable of performing a CRISPR (Clustered Regularly Interspaced Short Palindromic Repeats) reaction with the sample solution subjected to the RPA reaction, wherein a control hole is defined at the CRISPR solution chamber; and a CRISPR reaction chamber connected to the CRISPR solution chamber via a channel and receiving therein the CRISPR solution, wherein in the CRISPR reaction chamber to which the CRISPR solution has been supplied, the CRISPR solution is mixed with the sample solution such that the CRISPR reaction is carried out.

8. The cartridge for virus detection of claim 6, wherein the cartridge for virus detection comprises two or more detection flow paths, wherein the detection flow paths detect different viruses or different RNAs, respectively.

9. A system for virus detection, the system comprising:

a cartridge; and a tray into which the cartridge is mounted, wherein the cartridge includes:

a sample chamber capable of accommodating therein a sample solution containing therein magnetic beads capable of fixing a virus thereto, wherein a control hole is formed at the sample chamber;

a lysis chamber connected to the sample chamber via a channel and capable of receiving the sample solution therefrom, wherein a lysis reaction is carried out in the lysis chamber; and a detection flow path having one or more first degassing holes formed at a downstream end thereof, wherein the detection flow path is capable of extracting the sample solution free of the magnetic beads from the lysis chamber under a negative pressure generated by an interaction between the control hole and the first degassing hole, and of detecting the virus therefrom, wherein the tray includes:

a magnetic force applicator disposed adjacent to the lysis chamber to apply a magnetic force to the magnetic bead to fix the magnetic bead thereto when the cartridge has been mounted into the tray;

a negative pressure pump capable of applying the negative pressure to the first degassing hole;

an actuator capable of controlling opening and closing of the control hole; and a controller capable of operating the magnetic force applicator, the negative pressure pump, and the actuator according to a predetermined order and timing.

10. The system for virus detection of claim 9, wherein the cartridge further includes:

a washing chamber connected to the lysis chamber via a channel, and accommodating therein a washing solution capable of washing the sample solution in the lysis chamber, wherein a control hole is defined at the washing chamber; and a waste chamber connected to the lysis chamber via a channel, and accommodating therein a waste solution obtained by washing the sample solution in the lysis chamber, wherein a second degassing hole is defined at a downstream end of the waste chamber, wherein the tray further includes an actuator capable of controlling opening and closing of the control hole of the washing chamber, wherein the negative pressure pump is capable of applying the negative pressure to the second degassing hole.

11. The system for virus detection of claim 9, wherein the cartridge further includes a resuspension chamber connected to the lysis chamber via a channel, and accommodating therein a resuspension solution protecting a RNA released when the lysis reaction occurs in the sample solution in the lysis chamber, wherein a control hole is defined at the resuspension chamber, wherein the tray further includes an actuator capable of controlling opening and closing of the control hole of the resuspension chamber.

12. The system for virus detection of claim 9, wherein each of the control holes is spaced apart from each of the channels, wherein each chamber is formed in a funnel structure narrowing in an extension direction of each channel.

13. The system for virus detection of claim 9, wherein the magnetic bead in the sample solution is coated with a predetermined virus immobilization material.

14. The system for virus detection of claim 9, wherein the detection flow path includes:

at least one detection solution chamber for accommodating therein a detection solution capable of performing a reaction with the sample solution, wherein a control hole is formed at the detection solution chamber; and at least one detection reaction chamber connected to the detection solution chamber via a channel, wherein in the detection reaction chamber to which the detection solution has been supplied, the detection solution is mixed and reacts with the sample solution, wherein the tray further includes an actuator capable of controlling opening and closing of the control hole of the detection solution chamber.

15. The system for virus detection of claim 9, wherein the detection flow path includes:

a RPA solution chamber accommodating therein an RPA solution capable of performing an RPA (Recombinase Polymerase Amplification) reaction with the sample solution, wherein a control hole is formed at the RPA solution chamber;

an RPA reaction chamber connected to the RPA solution chamber via a channel, wherein in the RPA reaction chamber to which the RPA solution has been supplied, the RPA solution is mixed with the sample solution such that the RPA reaction is carried out;

a CRISPR solution chamber positioned downstream of the RPA reaction chamber and accommodating therein a CRISPR solution capable of performing a CRISPR (Clustered Regularly Interspaced Short Palindromic Repeats) reaction with the sample solution subjected to the RPA reaction, wherein a control hole is defined at the CRISPR solution chamber; and a CRISPR reaction chamber connected to the CRISPR solution chamber via a channel and receiving therein the CRISPR solution, wherein in the CRISPR reaction chamber to which the CRISPR solution has been supplied, the CRISPR solution is mixed with the sample solution such that the CRISPR reaction is carried out, wherein the tray further includes an actuator capable of controlling opening and closing of each of the control hole of the RPA solution chamber and the control hole of the CRISPR solution chamber.

16. The system for virus detection of claim 14, wherein the cartridge includes two or more detection flow paths, wherein the detection flow paths detect different viruses or different RNAs, respectively.

* * * * *